(12) United States Patent
Smyrniotis et al.

(10) Patent No.: US 9,718,025 B2
(45) Date of Patent: Aug. 1, 2017

(54) REDUCING HYDROCHLORIC ACID IN CEMENT KILNS

(71) Applicant: FUEL TECH, INC., Warrenville, IL (US)

(72) Inventors: Christopher R. Smyrniotis, St. Charles, IL (US); Kent W. Schulz, Geneva, IL (US); Emelito P. Rivera, Inverness, IL (US); Ian Saratovsky, Highland Park, IL (US); Vasudeo S. Gavaskar, Naperville, IL (US)

(73) Assignee: FUEL TECH, INC., Warrenville, IL (US)

( * ) Notice: Subject to any disclaimer, the term of this patent is extended or adjusted under 35 U.S.C. 154(b) by 8 days.

(21) Appl. No.: 14/870,366

(22) Filed: Sep. 30, 2015

(65) Prior Publication Data
US 2016/0016113 A1    Jan. 21, 2016

Related U.S. Application Data

(63) Continuation-in-part of application No. 13/854,361, filed on Apr. 1, 2013, now Pat. No. 8,916,120, and a
(Continued)

(51) Int. Cl.
*B01D 53/68* (2006.01)
*C04B 11/26* (2006.01)
(Continued)

(52) U.S. Cl.
CPC .......... *B01D 53/68* (2013.01); *B01D 53/507* (2013.01); *B01D 53/64* (2013.01); *B01D 53/77* (2013.01);
(Continued)

(58) Field of Classification Search
CPC ............ B01D 53/68; B01D 53/685; B01D 2257/2045; B01D 2258/0233; C04B 11/26; F23J 2215/30
See application file for complete search history.

(56) References Cited

U.S. PATENT DOCUMENTS 2,965,438 A   12/1960  Mullen, Jr.
3,226,192 A   12/1965  Atsukawa
(Continued)

FOREIGN PATENT DOCUMENTS

EP    2566601 A1 *  3/2013  ............ B01D 53/04
WO    9219365 A1    11/1992
(Continued)

OTHER PUBLICATIONS

EPA-452/R-97-010; Dec. 1997; Mercury Study, Report to Congress; vol. VIII: An Evaluation of Mercury Control Technologies and Costs.
(Continued)

*Primary Examiner* — Timothy Vanoy
(74) *Attorney, Agent, or Firm* — Thaddius J. Carvis

(57) ABSTRACT

The description relates to reducing hydrochloric acid in cement kilns. In one aspect, an aqueous copper-based chloride remediator is introduced into contact with combustion gases from a cement kiln. Injection is made into a defined introduction zone under conditions effective for HCl emissions control wherein the temperature is within the range of from 300° F. to 800° F., preferably from 550° F. to 750° F. The resulting gases are discharged from the defined zone following sufficient reaction time to reduce the HCl concentration in the gases.

4 Claims, 1 Drawing Sheet

Related U.S. Application Data continuation-in-part of application No. 14/190,451, filed on Feb. 26, 2014, now Pat. No. 9,393,518.

(60) Provisional application No. 62/057,471, filed on Sep. 30, 2014.

(51) Int. Cl.
   B01D 53/77 (2006.01)
   F23J 15/00 (2006.01)
   B01D 53/50 (2006.01)
   B01D 53/64 (2006.01)

(52) U.S. Cl.
   CPC ......... F23J 15/003 (2013.01); *B01D 2251/60* (2013.01); *B01D 2251/80* (2013.01); *B01D 2257/2045* (2013.01); *B01D 2257/302* (2013.01); *B01D 2257/602* (2013.01); *B01D 2258/0233* (2013.01); *F23J 2215/20* (2013.01); *F23J 2215/30* (2013.01); *F23J 2215/60* (2013.01)

(56) References Cited

U.S. PATENT DOCUMENTS

| | | |
|---|---|---|
| 3,900,504 A | 8/1975 | Woerner |
| 3,956,458 A | 5/1976 | Anderson |
| 4,020,180 A | 4/1977 | Woerner |
| 4,126,000 A * | 11/1978 | Funk .................. B01D 53/002 60/643 |
| 4,500,327 A | 2/1985 | Nishino et al. |
| 4,724,130 A | 2/1988 | Statnick et al. |
| 4,731,233 A | 3/1988 | Thompson |
| 4,755,499 A | 7/1988 | Neal et al. |
| 4,923,688 A | 5/1990 | Iannicelli |
| 5,114,898 A | 5/1992 | Pinnavaia et al. |
| 5,492,685 A | 2/1996 | Moran |
| 5,520,898 A | 5/1996 | Pinnavaia et al. |
| 5,658,547 A | 8/1997 | Michalak |
| 5,740,745 A | 4/1998 | Smyrniotis |
| 5,897,688 A | 4/1999 | Voght et al. |
| 6,060,030 A * | 5/2000 | Schwab ............... B01D 53/346 106/762 |
| 6,281,164 B1 | 8/2001 | Demmel et al. |
| 6,579,507 B2 | 6/2003 | Pahlman et al. |
| 6,808,692 B2 | 10/2004 | Oehr |
| 6,878,358 B2 | 4/2005 | Vosteen et al. |
| 6,953,494 B2 | 10/2005 | Nelson |
| 6,974,564 B2 | 12/2005 | Biermann et al. |
| 7,435,286 B2 | 10/2008 | Olson et al. |
| 7,666,374 B2 | 2/2010 | Grochowski |
| 2005/0031515 A1* | 2/2005 | Charette ............... B01D 53/83 423/244.07 |
| 2006/0210463 A1 | 9/2006 | Comrie |
| 2008/0127631 A1 | 6/2008 | Haitko |
| 2009/0056538 A1 | 3/2009 | Srinivasacher et al. |
| 2010/0059428 A1 | 3/2010 | Boren |
| 2010/0282140 A1 | 11/2010 | Matteson et al. |
| 2010/0317509 A1 | 12/2010 | Wang |
| 2011/0045422 A1 | 2/2011 | Tanca |
| 2011/0079143 A1 | 4/2011 | Marotta et al. |
| 2014/0296607 A1* | 10/2014 | Baptist ............... B01D 15/1871 585/822 |

FOREIGN PATENT DOCUMENTS

| | | | |
|---|---|---|---|
| WO | 0216026 A2 | 2/2002 | |
| WO | WO 2009095121 A1 * | 8/2009 | ............. B01D 7/02 |
| WO | 2011143517 A1 | 11/2011 | |
| WO | WO 2011139787 A1 * | 11/2011 | ............. B01D 53/04 |
| WO | WO 2015046200 A1 * | 4/2015 | ............. C04B 7/60 |

OTHER PUBLICATIONS

Kettner, The Removal of Sulfur Dioxide from Flue Gases. Bulletin of the World Health Organization. 32: 421-429, 1965 [retreived from the Internet.<URL:http://whqlibdoc.who.int/bulletin/1965/Vol32/Vol32-No3/bulletin_1965_32%283T 29_421-429.pdf>.
Srivastava, Ravi K., Controlling SO2 Emissions: A Review of Technologies; EPA/600/R-00/0093, Nov. 2000.
PCT/US2014/018586 Search Report, May 2014.

* cited by examiner

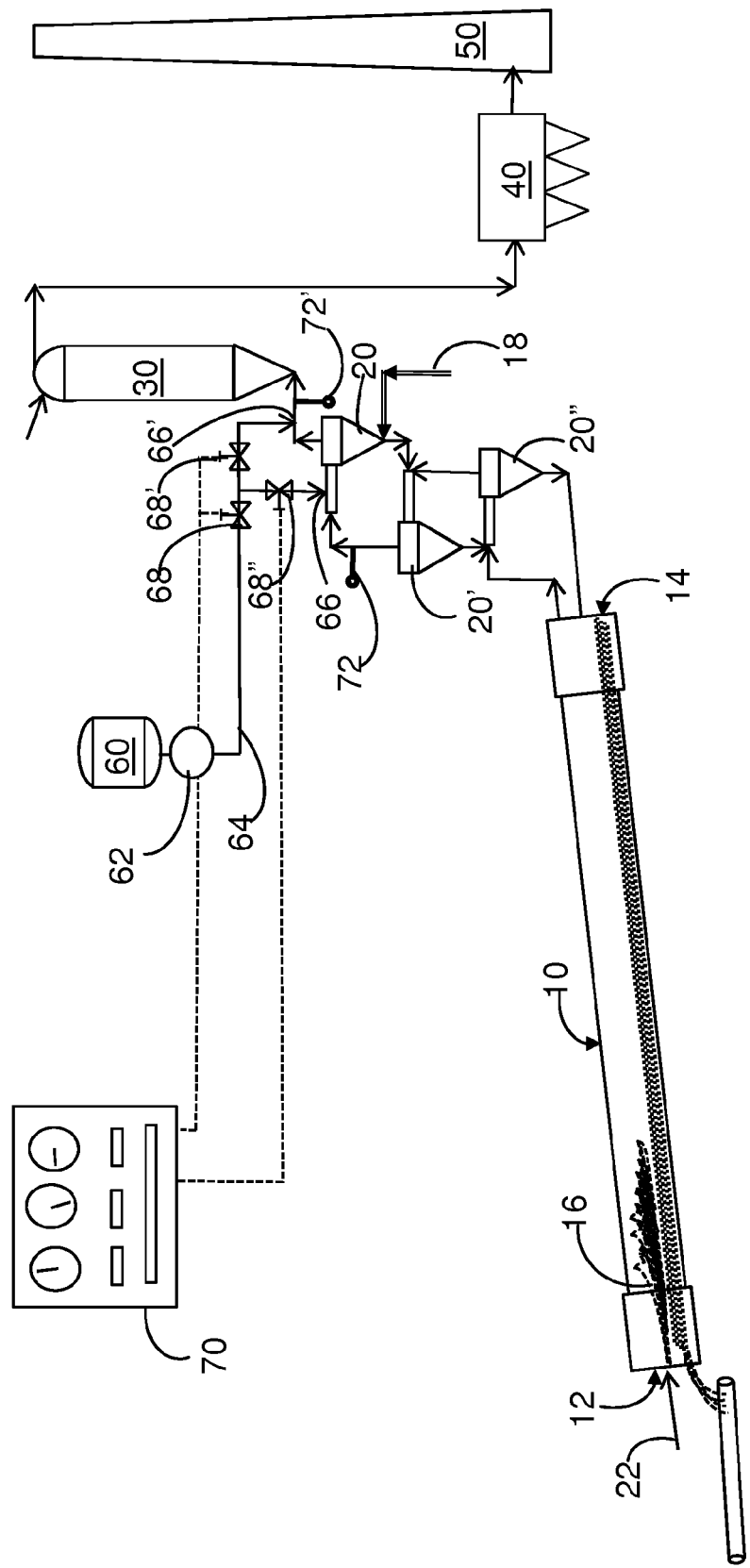

REDUCING HYDROCHLORIC ACID IN CEMENT KILNS

This application claims priority to and is a continuation in part of U.S. Provisional Application No. 62/057,471, filed Sep. 30, 2014 and U.S. patent application Ser. No. 13/854,361, filed Apr. 1, 2013, now U.S. Pat. No. 8,916,120, and Ser. No. 14/190,451, filed Feb. 26, 2014, now U.S. Pat. No. 9,393,518, and the disclosures of those applications are incorporated by reference herein in their entireties.

FIELD OF THE INVENTION

The invention relates to a treating coal combustion gases from cement kilns to reduce emissions of hydrogen chloride (HCl) and/or mercury (Hg) employing a group of highly-effective chemicals.

BACKGROUND OF THE INVENTION

Cement kilns are used to manufacture of Portland and other types of hydraulic cement by a process often called pyroprocessing. In the process, calcium carbonate is reacted with silica-bearing minerals and forms a variety of mixed calcium silicates. These kilns consume large amounts of fuel and create large amounts of combustion gases in need of treatment.

Cement plants can be divided into two major categories, wet and dry, while there are also variations of these. In the dry kiln process, raw materials are first milled and then fed to the kiln. In wet-process plants, water is added as a part of the process, typically to a ball mill or the like for grinding the raw materials to produce a slurry to feed the kiln. A hybrid, or semidry process, mixes water with a dry raw mix in a pelletizer to form pellets that are conveyed through a preheater, where they are dried and partially calcined before entering a rotary kiln.

Depending on the process, the desired form of feed mixture will be fed into an elevated end of a rotating kiln to be processed and discharged from a low end. Combustion of fuel supplies heat for the process from a burner located at the low end. The fuel can be any carbonaceous fuel, but is typically coal and in some cases can include refuse.

The kilns are operated at high temperatures and the fuel materials are essentially completely combusted. Solid residue from the combustion will be incorporated into cement clinker that is formed. Gaseous combustion products pass upward through the kiln and a series of cyclones that separate out entrained solids and can pretreat incoming feed. Temperatures in the kiln are high, typically on the order of 3,000° F. or so.

The raw materials and fuel will produce gaseous combustion products that include chlorine or sulfur. Combustion of these materials can form gaseous HCl, as well as mercury and $SO_x$, in the combustion gases. Combustion can also form low-melting compounds that can form scale on internal walls of process equipment. The scale can cause processing problems including increased pressures in the gasses and partial or complete clogging in one or more cyclones.

The art has developed a number of measures to lessen these problems, but all have expenses and limitations. The formation of scale deposits corresponds to the melting points of compounds formed and the temperature distribution in ducts, cyclones and other equipment used at the gas discharge end. Scale formation at these locations has been mainly attributed to sulfides and chlorides. In one proposed solution, chlorine bypass technology proposes recovering chlorine from where chlorine is condensed most, e.g., a preheater section. Chlorine recovery can reduce chlorine from condensing on raw materials and can help mitigate the formation of scale caused by chlorine condensation.

In other technologies, the scale is permitted to form and then addressed with a descaler such as an air blaster, which descales by blowing compressed air, or a soot blower, which can periodically blow high-pressure steam or water where the scale forms.

The release of mercury emissions from cement kilns is largely a result of the type of fuel used, but can also be caused by cement feed materials. Many techniques have been tried, but they all have high costs and limitations.

The problems with emissions of hydrochloric acid and mercury are particularly troublesome and have not been adequately addressed by the many technologies used to reduce them. Moreover, known technologies, such as adsorption on carbon, can adversely affect the quality of the cement produced.

It would be important to the environment if hydrochloric acid, desirably along with $SO_x$ and/or mercury, could be well and economically controlled in the production of cement, preferably with minimal negative effect on the cement and with improved economies of operation such as by controlling scale formation during processing.

SUMMARY OF THE INVENTION

The present invention provides processes relating to treating combustion gases produced by cement kilns.

In one aspect, the invention provides a process for decreasing hydrochloric acid in combustion gases from cement kilns comprising: introducing an aqueous copper-based chloride remediator into contact with combustion gases from a cement kiln within a defined introduction zone under conditions effective for HCl emissions control wherein the temperature is within the range of from 300° F. to 800° F., preferably from 550° F. to 750° F.; and discharging the gases from the defined zone following sufficient reaction time to reduce the HCl concentration in the gases.

In another aspect, gaseous mercury and/or $SO_x$ emissions are also controlled.

Other preferred aspects, including preferred conditions and equipment and their advantages, are set out in the description which follows.

BRIEF DESCRIPTION OF THE DRAWINGS

The invention will be better understood and its advantages will become more apparent when the following detailed description is read in conjunction with the accompanying drawings, in which:

FIG. 1 is a schematic view of one embodiment of a process of the invention.

DETAILED DESCRIPTION OF THE INVENTION

The invention can be employed as a retrofit solution to existing combustors and can be used in design of new combustors. One embodiment of the process for reducing hydrochloric acid in cement kiln combustion gases according to the invention is illustrated schematically in FIG. 1.

Reference will first be made to FIG. 1, which is a flow diagram of one embodiment of the process of the invention, which shows a cement kiln generally as 10. It will be understood that other types of kilns can be employed to obtain the advantages of the invention. Unless otherwise indicated, all parts and percentages in this description are based on the weight of the materials at the particular point in processing or dry where that is indicated.

The kiln is comprised of a cylinder having a lower end 12 and an elevated end 14 located centrally along and rotating about a long axis extending between the two ends 12 and 14. A suitable fuel, such as coal, is fed to a burner 16 to produce hot combustion gases at the lower end 12 of the kiln 10. The hot combustion gases flow upwardly through the kiln 10 toward upper end 14.

Raw materials for cement formation, e.g., a mixture of limestone and clay or shale which together form a fine rawmix, can be fed to the process via line 18 into one cyclone 20 in a series, 20, 20' and 20". The rawmix will be dried by exiting gases and mixed with entrained solids that are separated from the gases.

It is an advantage of the invention that coal that has significant chloride and mercury can be combusted with the resulting pollutant HCl and/or Hg emissions reduced. It will be understood that the principles of the invention can be applied to other carbonaceous fuels and fuel mixtures (any other fuel of choice, typically a carbonaceous thermal fuel or refuse).

Air for combustion, supplied by line 22 to the low end 12 of the combustor can be preheated, if desired, using equipment not shown that takes advantage of residual heat in the combustion gases flowing from the cyclones.

The gases from cyclones 20, 20' and 20" (there may be more or less) can be directed to a cooling tower 30 and then to solids separation equipment such as an electrostatic precipitator and/or baghouse 40 prior to discharge via stack 50.

According to one aspect of the process of the invention, HCl, and if desired mercury and/or $SO_x$ can be reduced by introducing an aqueous copper-based chloride remediator into contact with combustion gases from a cement kiln within a defined introduction zone under conditions effective for HCl emissions control wherein the temperature is within the range of from 300° F. to 800° F., preferably from 550° F. to 750° F. Introduction can be made from supply 60 via pump 62 and line 64 at one or more positions such as illustrated at 66 and 66' or as otherwise determined. Valves 68, 68' and 68", for example, can control delivery to the correct zone by controller 70 in response to preset programming and temperature measurement by sensors 72 and 72', for example.

A group of highly-active copper compositions are effective for remediating HCl and/or mercury emissions and can be employed as water-borne chemicals for introduction into a flue gas to be treated. The group of copper compositions effective for HCl and/or $SO_x$ emissions control according to the invention are referred to herein as copper-based chloride remediators (CBCRs). As used in this description, the term "composition" includes compounds and complexes and is not meant to differentiate between types of bonding, e.g., "strong bonds" such as covalent or ionic bonds and "weak bonds" such as dipole-dipole interactions, the London dispersion force and hydrogen bonding. It is believed that some of the CBCRs are chemical complexes. Compositions described in U.S. Pat. Nos. 3,900,504 and 4,020,180 to Woerner are included as CBCR compositions, and the disclosures of these patents are specifically incorporated herein by reference in their entireties. Specifically referenced compositions are those described in U.S. Pat. No. 4,020,180 as comprising an aqueous cuprammonium lower carboxylate complex of copper lower carboxylate and ammonium lower carboxylate in weight proportions of about 13 parts of copper lower carboxylate as measured as the dihydrate to about 2 parts of ammonium lower carboxylate, and about 10 parts of 29 percent aqueous ammonia, said solution being at a pH in the range of about 7.1 to 7.4.

Significantly, these compositions are not sorbents that collect pollutants and survive passage though the combustor for collection downstream. The CBCRs identified by the invention do not survive but are chemically altered to a form that reacts with the target pollutants.

The CBCR compositions of interest according to the invention are highly soluble or dispersible in water and react with the hot combustion gases to result in compositions chemically different from when contacted with the combustion gases. The compositions of interest include copper compositions that have copper in a form that can be released at the temperatures involved to form a reactive copper entity. While it is theorized that the copper is oxidized to copper oxide, CuO, applicants do not want to be bound by a particular theoretical reaction. It is believed that the reactive form of copper released can react with the HCl in the combustion gases to form a solid, e.g., CuCl with minor amounts of $CuCl_2$, that can be collected with the ash by conventional particulate separation equipment such as an electrostatic precipitator (ESP) or a baghouse 62, alone or in suitable combination that may include one or more other particulate recovery devices. The ash recovered will be of suitable quality for use in Portland cement and will comprise coal ash, water-insoluble copper(I) composition, and metallic mercury adsorbed onto ash particles, wherein the water-insoluble copper(I) compositions predominate in weight relative to the water-soluble copper compositions. The coal ash composition of the invention can have a total mercury content of from 0.1 to 2.0 ppm and the water-soluble mercury is less than 20% of the total mercury content. The ash component of the fuel, which is incorporated into the cement clinker, is desirably effective for use in cement compositions if it has a composition as described in U.S. patent application Ser. No. 14/468,978, filed Aug. 26, 2014, the disclosure of which in incorporated herein in its entirety.

Among the CBCRs of interest to the invention are compositions that comprise copper and an ammonia moiety. Among these are ammonium copper compositions, including those having one or more copper atoms with one or more ammonium moieties. Water solubility or dispersibility is important because introducing them with water has been shown to be a highly-effective manner of achieving the necessary distribution followed by dissociation. Chemical dispersants and agitation can be employed as necessary.

In some embodiments of the invention, the CBCR will comprise a copper composition selected from the group consisting of copper ammonium acetate, copper diammonium diacetate, copper ammonium triacetate, copper triammonium acetate, copper acetate and hydrates thereof, e.g., copper acetate monohydrate, copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these. From another perspective, the CBCR can be a member selected from the group consisting of compositions defined by the formula $Cu(NH_3)_x(\text{lower carboxylate})_y$, wherein the lower carboxylate is selected from the group consisting of formate, acetate and propionate, x is an integer from 0 to 4, y is an integer from 0 to 2, and x+y is equal to or greater than 1.

Closely related compositions and their hydrates as well other copper sources that exhibit similar efficacies in reacting with HCl can be employed. Copper compositions that contain no ammonium moiety, can be employed, but it is believed that these compositions will be facilitated in effectiveness by the presence of ammonia, such as a result of processing (e.g., for $NO_x$ reduction) or by supplementation as needed with ammonia or urea or other material effective to produce ammonia at the temperatures involved, as well as compounds equivalent in effect, e.g., ammines and their salts, urea breakdown products, ammonium salts of organic and inorganic acids, ammonium carbamate, biuret, ammelide, ammeline, ammonium cyanate, ammonium carbonate, ammonium bicarbonate; ammonium carbamate; triuret, cyanuric acid; isocyanic acid; urea formaldehyde; melamine; tricyanourea and mixtures and equivalents of any number of these.

Among the CBCRs not containing an ammonium moiety are copper acetylacetonate (and hydrates thereof), copper citrate (and hydrates thereof, e.g., hemipentahydrate), copper formate (and hydrates thereof), copper nitrate (and hydrates thereof), copper 2,4-pentandionate (and hydrates thereof), copper sulfate (and hydrates thereof), copper gluconate (and hydrates thereof), copper soaps of fatty acids, and mixtures of any of these.

The relative amounts of the materials and water can be controlled by controller 70, or batching and feed of the CBCRs can be achieved manually. Dotted lines in the drawings schematically designate control lines for proper communication between the various controlled lines and valves and the controller 70.

The aqueous CBCR will typically be supplied in aqueous form, e.g., containing from 80 to 99.8% water, with a narrower range being from about 85 to about 99%. These and other percentages given in this application are based on weight.

Preferred conditions will call for introducing the CBCRs using modeling techniques, such as computational fluid dynamics, which can be employed to initially determine the optimum locations (zones) to direct treatment chemicals within the boiler and/or ducts. Desirably, best CBCR introduction will achieve essentially full coverage of the CBCRs across a three-dimensional section of a passage for the gases to be treated. Preferably, a number of nozzles will be spaced within the zones to achieve at least 90% coverage at the temperature necessary for reaction. This section can have a depth in the direction of flow as necessary to assure complete coverage from the sorbent injectors used. In other words, the zone will preferably be of a depth in the direction of flow sufficient that each of the conical or like spray patterns from nozzles used to introduce the CBCR will overlap with at least one other spray pattern, thereby providing CBCR across the entire cross section of the zone. This three-dimensional section for treatment can be referred to as a defined introduction zone, and the aqueous CBCR will be introduced into this zone under conditions effective for HCl and/or $SO_x$ emissions control. Following this zone (i.e., downstream of it) the combustion gases now having been treated with the CBCR are discharged following sufficient reaction time to reduce the HCl and/or $SO_x$ concentration in the gases.

Depending on whether it is mercury or $SO_2$ is being treated, along with HCl, monitors for the designated pollutant will be positioned before and after the introduction zone to determine the effectiveness of the treatment. Monitors following the zone are positioned far enough downstream of the zone to assure time for essentially complete reaction between the pollutant and the CBCR. Residence times of at least one second and preferably from 2 to 5 seconds will usually be effective.

Desirably, the invention will achieve full effect by modeling, e.g., by mechanical modeling or computational fluid dynamics using computer and data input means to identify locations within a combustor for feeding aqueous CBCR and determine the physical form and injection parameters such as pressure, droplet size, droplet momentum and spray pattern for injection means positioned at locations, e.g., via injector locations.

Each of the injector locations will typically employ a plurality of nozzles strategically positioned across the cross section at the designated locations to achieve essentially full cross sectional coverage.

The treatment rates of the aqueous CBCR will provide an effective amount of aqueous CBCR to assure that the HCl content is maintained below about 0.002 pounds per MMBtu (approximately 2.0 $ppm_v$). Feed rates will generally be less than 10 pounds per ton of fuel, e.g., from about 1 to 8 pounds per ton, and often from greater than about 1 to about 6 pounds per ton of fuel.

The invention will employ suitable injection means, such as nozzles of the internal mix or external mix type, which can be (but don't have to be) air atomized and are capable of feeding a hydrated dolomite sorbent and a sorbent doping agent at a predetermined rate relative to a measured concentration of $SO_x$ in said passage. The injection means should be further capable of introducing the aqueous CBCR in a predetermined physical form and with predetermined injection parameters for the aqueous CBCR including droplet size, momentum and concentration. Preferably, air assisted-atomizing nozzles are provided for introducing aqueous CBCR into combustion gases at an effective temperature.

The locations for the nozzles can be determined by computational fluid dynamics, by methodologies taught for example in U.S. Pat. No. 5,740,745 and U.S. Pat. No. 5,894,806, which are hereby incorporated by reference. The concentration of the CBCR and water in the treatment fluid, the nozzle pressure, droplet size, droplet momentum, spray pattern and flow rates can be initially determined by modeling to assure that the proper amount of CBCR is supplied to the correct location in the combustor or downstream equipment in the correct physical form to achieve the desired results of reduced HCl and/or mercury.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence that is effective to meet the objectives there intended, unless the context specifically indicates the contrary.

The invention claimed is:

1. A process for decreasing hydrochloric acid in combustion gases from cement kilns comprising:
   a. introducing an aqueous copper-based chloride remediator into contact with combustion gases from a cement kiln within a defined introduction zone under conditions effective for HCl emissions control wherein the temperature is within the range of from 300° F. to 800° F.; and b. discharging the gases from the defined zone following sufficient reaction time to reduce the HCl concentration in the gases.

2. A process according to claim 1, wherein the temperature within the defined introduction zone is within the range of from 550° F. to 750° F.

3. A process according to claim 1, wherein the copper-based chloride remediator comprises a copper composition selected from the group consisting of the copper diammonium diacetate, copper ammonium triacetate, copper triammonium acetate, copper acetate and hydrates, copper acetylacetonate and hydrates thereof, copper citrate and hydrates thereof, copper formate and hydrates thereof, copper nitrate and hydrates thereof, copper 2,4-pentandionate and hydrates thereof, copper sulfate and hydrates thereof, copper gluconate and hydrates thereof, copper soaps of fatty acids, and mixtures of any of these.

4. A process according to claim 1, wherein the copper-based chloride remediator comprises a copper composition a member selected from the group consisting of compositions defined by the formula $Cu(NH_3)_x(\text{lower carboxylate})_y$, wherein the lower carboxylate is selected from the group consisting of formate, acetate and propionate, x is an integer from 0 to 4, y is an integer from 0 to 2, and x+y is equal to or greater than 1.

* * * * *